C. F. BURGESS.
DRY CELL.
APPLICATION FILED MAR. 26, 1917.
1,277,042.
Patented Aug. 27, 1918.
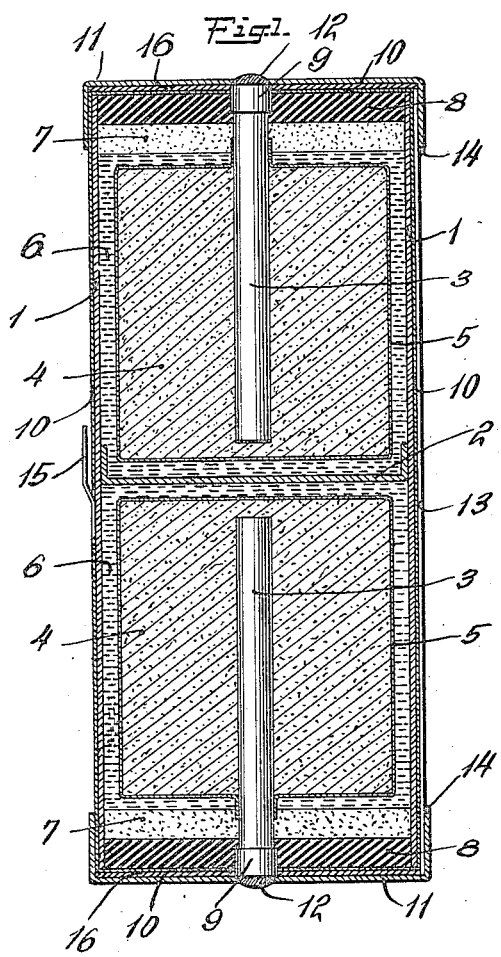
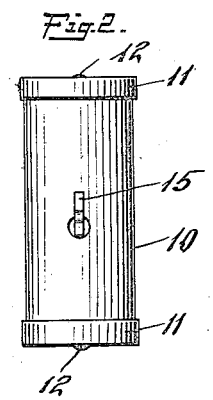
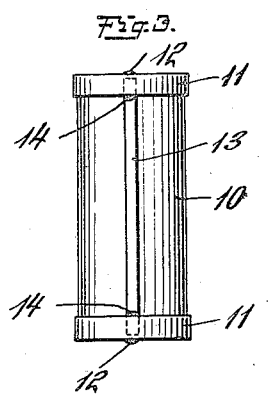
Inventor
Charles F. Burgess
By his Attorneys
Pennie Davis Marvin & Edmonds.

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

DRY CELL.

1,277,042.  Specification of Letters Patent.  Patented Aug. 27, 1918.

Application filed March 26, 1917. Serial No. 157,315.

*To all whom it may concern:*

Be it known that I, CHARLES F. BURGESS, a citizen of the United States, residing at Madison, in the county of Dane and State of Wisconsin, have invented certain new and useful Improvements in Dry Cells; and I do hereby declare the following to be a full, clear, and exact description of the invention, such as will enable other skilled in the art to which appertains to make and use the same.

In dry cells as ordinarily constructed, the zinc electrode of the galvanic couple is made to serve as the container for other active elements of the cell, and particularly for the semi-liquid or gelatinous electrolyte whereby the galvanic action is set up. To this end, it is customary to roll a sheet of zinc into the form of a tube and then solder the overlapped edges to form a cylinder. A disk of zinc is then cut to fit one end of the cylinder and is soldered in place to close that end and form a liquid-tight container. This operation of soldering in the bottom is expensive and troublesome, and in the rush of commercial production the soldering is not always accurately done, and leakage may develop at the joint even after the cell has been completely made up. A soldered joint at this part of the cell has other disadvantages, as will be readily appreciated by electro-chemists.

It is an object of the present invention to obviate the expense and disavantages of a soldered bottom by dispensing with the need for soldering.

It is a further object of the invention to provide a cell in which a single zinc electrode coöperates with a plurality of negative electrodes which, if desired, can be connected in multiple.

It is a further object of the invention to so construct the cell as to obtain a rugged structure free from many of the disadvantages of dry cells as heretofore generally constructed, and characterized by certain novel features contributing toward ready assembly of the cells into batteries and ready and reliable connection with electrical circuits on which they are to be used.

Other objects and advantages are made clear by the following detailed description, or will be recognized by those skilled in the art as inherent in the construction disclosed.

In the accompanying drawings,

Figure 1 is a sectional elevation of the preferred embodiment, complete with multiple connections and terminals for use in connecting to a work circuit;

Fig. 2 is an elevation on a much smaller scale illustrating particularly one of the current-supply terminals; and Fig. 3 is a similar view of the other side of the dry cell showing the multiple connection between the two negative electrodes.

In the construction illustrated by the drawing, the zinc or positive electrode 1 is in the form of a tube, preferably cylindrical, and may have the usual longitudinal soldered seam, not shown. It does not, however, have a soldered bottom. This zinc tube serves as a container for the other active elements of the cell. To assemble those elements within the zinc container, I place the container on end and insert near its middle a partition 2 which may be of tar paper crowded into place from above and suitably supported temporarily, as by a mandrel introduced into the container through the open lower end. I then proceed to fill the upper half of the tube much as if the tar paper disk were the usual soldered bottom of the zinc electrode. In the embodiment illustrated, the filling above the tar paper disk 2 comprises a carbon rod 3 about which is packed a depolarizing mixture 4 of manganese dioxid or equivalent depolarizer, and carbon or graphite. With this mixture is associated the usual amount of moisture and salts, and the mixture may be enveloped in a bibulous envelop 5 of cheese cloth or the like, according to usual practice. About the negative electrode so formed is a body of electrolyte 6 which may be of gelatinous character, according to usual practice.

Above the electrolytic paste is an air space 7 filled with sawdust or the like, and above that is a seal 8 of pitch or sealing wax adapted to hermetically close that end of the zinc container and to afford rigid support for the carbon rod 3. The upper end of the this rod may be provided with a brass or tinned iron cap 9 projecting slightly beyond the pitch seal, as in usual practice. The active elements above described as coöperating with the zinc tube to form a primary cell may vary in detail, but it is with cells of this general make-up that my invention has been used by me to best advantage.

After one-half of the cylindrical zinc container 1 has thus been filled up, or even before the layers of sawdust and sealing wax have been added, the zinc container is turned with the other end up and the space above tar paper disk 2 is similarly filled with active material to build therein a second complete cell for which the zinc container likewise serves as one electrode.

After the cells have thus been completely built up within the tubular zinc container, it is not vital whether tar paper disk 2 does or does not constitute a fluid-tight barrier between the elements on its opposite sides, for its primary function is that of serving as a temporary bottom for one-half of the zinc container until the container can be turned end for end and filled through the other end. With an electrolyte of sufficient stiffness it is possible to dispense entirely with the use of the tar paper disk by providing a temporary barrier for one-half the container until that half has been filled, and then withdrawing the barrier before the second half is filled. These are manufacturing expedients which readily suggest themselves and need not be set forth here at length.

With a dry cell constructed as above described, electrical connections may be established with the zinc container and with the carbon rods in usual manner, but I now prefer to utilize with such a cell a special wrapping and special adjuncts, as hereinafter described more at length.

About the dry cell assembled as above described I wrap one or more layers 10 of paper or equivalent insulating material. The wrapping is long enough to extend beyond the ends of the zinc container, and there fold down against the pitch seal, as illustrated in the drawing. Over each end of the wrapped dry cell I then slip a metal cap 11, according to the practice set forth at length in U. S. Letters Patent No. 1,188,408, issued in my name on June 27, 1916. These caps may be of brass or tinned iron and preferably fit tightly over the paper wrapping and so hold the wrapping in place while reinforcing the pitch seal, as set forth at length in said patent. Through a perforation at the center of each cap a drop of solder 12 may be introduced to establish electrical connection between the cap and the usual brass cap 9 with which each carbon rod 3 is provided.

Inasmuch as the two caps 11 at the respective ends of the dry cell are of the same polarity, it is expedient to connect them together as by a brass strip 13 lying outside of paper wrapping 10, and having its ends held under caps 11. A drop of solder may be applied at 14 to insure permanency of the electrical connection and to increase the security of anchorage of end caps 11. Electrical connection can then be made with either end cap 11 or with strip 13 and the two halves of the cell will operate in multiple. Electrical connection with the zinc can be obtained by perforating paper wrapping 10 and soldering on a brass strip 15, as indicated particularly in Fig. 2.

With the paper wrapping folded inward over the edges of the zinc container 1, the end caps 11 are adequately insulated from the zinc though, if desired, a tar paper washer 16 may line the bottom of each cap to assist in more effective insulation around the somewhat sharp edge of the zinc tube. Inasmuch as the attachment of terminal 15 may be the last operation carried out in the factory, and inasmuch as all other exposed metal parts are of the same polarity, there is little danger of short-circuiting the cells among themselves during factory manipulation and storage. Many of the advantages set forth at length in my above entitled patent are inherent in the construction above described.

In the present construction, the paper wrapping 10 may be waterproofed before being applied to the zinc or may be waterproofed after the article has been completely built up as above described, as, for instance, by dipping the article into melted paraffin. This not only makes the entire paper wrapping waterproof but also gives to the exposed metal parts a thin coating advantageous in preventing tarnishing. The waterproofed paper wrapping prevents leakage of the cell contents in case the zinc should become corroded after normal use, and also prevents evaporation and drying out of the cell in case the zinc has become perforated. It is also a protection to metal or other casings or boxes in which such cells may be stored or may be used.

Dry cells constructed as above described may be of any of the sizes and capacities now common, such, for instance, as the six inch cells often used for telephone and ignition work, and such as the much smaller or novelty sizes so commonly used in battery hand lamps, gas lighters, and the like. When using cells of the present invention in battery hand lamps and novelty devices, special arrangements may be made to take advantage of the multiple character of the cell and the somewhat unusual construction of the external conductors or terminals.

I claim:

1. A dry cell having a plurality of endwise alined electrodes forming the negative element of the cell, and a continuous container surrounding those electrodes and forming the positive element of the cell; substantially as described.

2. A dry cell having a plurality of endwise alined and separated electrodes forming the negative element of the cell, and a continuous container surrounding said electrodes and forming the positive element of the cell; substantially as described.

3. A dry cell having a container serving as an electrode, and a pair of electrodes of opposite polarity thereto coöperating therewith and accessible respectively through opposite ends of said container.

4. A dry cell having an open-ended container serving as the positive element of the cell, and a pair of endwise alined electrodes forming the negative element of the cell and being accessible through the respective ends of the container.

5. A dry cell having a container serving as an electrode, and a pair of electrodes of opposite polarity thereto coöperating therewith and accessible respectively through opposite ends of said container, and means connecting said pair of electrodes in multiple.

6. A dry cell having an open-ended container serving as an electrode of one polarity, a cross partition intermediate the ends of said container, and means coöperative with said container to form a complete cell on each side of said partition.

7. A dry cell comprising a zinc tube, a cross partition intermediate the ends thereof, and means coöperating with said zinc tube to form a complete dry cell on each side of said partition.

8. In a dry cell, the combination of a zinc container open at its ends and carbons sealed into the two ends of said container.

9. In a dry cell, the combination of a zinc tube open at its ends and forming the positive element of the cell, a cross partition intermediate the ends of said tube, and a plurality of electrodes forming the negative element of the cell and being accessible at opposite ends of the tube.

10. In a dry cell, the combination of a zinc tube open at its ends and forming the positive element of the cell, a plurality of electrodes forming the negative element of the cell, caps electrically connected to the respective electrodes and positioned over the ends of the cell, and an insulating wrapping covering the container and insulating the caps therefrom.

11. A dry cell having a zinc container serving as the positive element of the cell, a plurality of electrodes forming the negative element of the cell and being accessible at either end of said zinc container, and a metal cap slipped over each end of said zinc container and connected to the electrode at that end.

12. A dry cell comprising a zinc tube, and means coöperating with said tube to form a complete electrolytic cell in each longitudinal half thereof, substantially as described.

13. A dry cell comprising a zinc tube, means coöperating with said tube to form a complete dry cell in each half thereof, an insulating covering for said tube, and caps for the ends of said tube and electrically connected to one another.

14. A dry cell comprising in combination a zinc tube open at both ends, a carbon sealed into each of said ends, and means electrically connecting said carbons together to operate in multiple, substantially as described.

15. A dry cell having a zinc element, metal caps slipped over the respective ends thereof and permanently insulated from the zinc, and a carbon element secured to each cap, substantially as described.

16. The combination of a tubular zinc electrode, a paper wrapping about said electrode, said wrapping overlapping the edges of the zinc, metal caps covering both ends of the cell and tightly gripping said wrapping, and a pair of carbon elements within said tubular zinc electrode and each soldered to one of said caps.

In witness whereof I affix my signature.

CHARLES F. BURGESS.